US 6,697,183 B2

(12) United States Patent
Atsuumi et al.

(10) Patent No.: US 6,697,183 B2
(45) Date of Patent: Feb. 24, 2004

(54) LIGHT BEAM SCANNING APPARATUS AND IMAGE FORMING SYSTEM INCORPORATING SUCH APPARATUS

(75) Inventors: Hiromichi Atsuumi, Yokohama (JP); Atsushi Kawamura, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/210,056

(22) Filed: Aug. 2, 2002

(65) Prior Publication Data

US 2003/0043443 A1 Mar. 6, 2003

(30) Foreign Application Priority Data

Aug. 2, 2001 (JP) .................................. 2001-235438

(51) Int. Cl.[7] .............................................. G02B 26/08
(52) U.S. Cl. .................. 359/207; 359/204; 359/205; 359/216; 347/244; 347/258; 347/259
(58) Field of Search ................................ 359/204–208, 359/216–219; 347/244, 258, 259

(56) References Cited

U.S. PATENT DOCUMENTS 6,448,998 B1 * 9/2002 Suzuki et al. ............... 347/258
6,590,688 B2 * 7/2003 Ishihara ...................... 359/205

FOREIGN PATENT DOCUMENTS

JP           10-054952           2/1998

* cited by examiner

Primary Examiner—James Phan
(74) Attorney, Agent, or Firm—Oblon, Spivak, McClelland, Maier & Neustadt, P.C.

(57) ABSTRACT

A light beam scanning apparatus is provided having a light source for emitting light beams, a first optical unit for optically coupling the light beams, a second optical unit for converging the light beams into an approximately line image elongated along the horizontal scanning direction, a light beam deflector for deflecting the light beams by interaction with reflecting planes, and a third optical unit for converging the light beams deflected by the light beam deflector into a spot of light formed on the surface to be scanned, in which the third optical unit includes first and second anamorphic optical elements, each having a positive power along the horizontal and vertical scanning directions, respectively, and the magnification of the third optical unit is approximately constant and the power of the first anamorphic optical element L1 is also approximately constant irrespective of deflection angle for the light beam scanning. The beam scanning apparatus is capable of reducing undesirable increase in aberration caused by possible errors at fabrication or assembly steps and alleviating undue changes in beam spot diameter in the vertical scanning direction resulting from a large image height.

28 Claims, 9 Drawing Sheets

POWER VS. DEFLECTION ANGLE IN VERTICAL SCANNING DIRECTION FOR ELEMENTS L1 AND L2

IMAGE SURFACE CURVATURE fθ CHARACTERISTIC

LIGHT BEAM SCANNING APPARATUS AND IMAGE FORMING SYSTEM INCORPORATING SUCH APPARATUS

BACKGROUND OF THE INVENTION

1. Field of the Invention

This invention relates to a light beam scanning apparatus used for image forming apparatus and systems such as a duplication machine, printer, facsimile apparatus and other similar systems, and more particularly to such scanning apparatus provided with the capability of reducing a change in the diameter of beam spots on a photoreceptor while scanning light beams thereon.

2. Discussion of the Background

In the course of recent developments of digital duplication machines and laser printers, more attention has been focused on the increase in the density of recording, which necessitates the reduction of the diameter of beam spots formed on a photoreceptor in these machines. In order to achieve such improvements, several disclosures have been put forward such as, for example, an optical unit having so-called free-form curvature to effectively correct aberration, in which the unit is formed to have a curvature without rotational axis.

As an example, Japanese Laid-Open Patent Application No. 10-54952 discloses a light beam scanning apparatus which includes first and second anamorphic optical elements. In the scanning apparatus in that disclosure, the magnification in the horizontal scanning direction of the first anamorphic optical element is designed to be varied with the position in the horizontal direction such that the magnification of the light beam scanning apparatus, consisting of the first and second anamorphic optical elements, is constant irrespective of the deflection angle. As a result, an undesirable change in beam spot diameter due to large image height in the vertical scanning direction can be alleviated along with undue changes in the distance between neighboring scanning lines in the case of multiple-beam scanning apparatus.

In such a light beam scanning apparatus, however, several difficulties arise as to maintaining sufficient accuracy of fabricating optical elements and assembling the scanning apparatus due to possible errors during fabrication or assembly steps, when the magnification of the light beam scanning apparatus changes with deflection angle.

SUMMARY OF THE INVENTION

Accordingly, it is an object of the present invention to provide a light beam scanning apparatus, having most, if not all, of the advantages and features of similar employed systems, while eliminating many of the aforementioned disadvantages.

It is another object to provide a light beam scanning apparatus in which the magnification of the light beam scanning apparatus in the vertical scanning direction is maintained to be approximately constant irrespective of deflection angle. This becomes feasible by making the power of a first anamorphic optical element L1 in the vertical scanning direction approximately constant irrespective of deflection angle and, with the thus fabricated optical elements and scanning apparatus, by alleviating undesirable change of beam spot diameter in the vertical scanning direction, which is caused by a large image height, yet reducing undue increase in aberration caused by possible errors during fabrication or assembly steps.

The following brief description is a synopsis of only selected features and attributes of the present invention. A more complete description thereof is found below in the section entitled "Description of the Preferred Embodiments."

The light beam scanning apparatus disclosed herein includes at least a light source for emitting light beams, a first optical unit is configured to optically couple together the light beams emitted from the light source, a second optical unit is configured to converge the light beams received from the first optical unit into an approximately line image elongated along the main (i.e., horizontal) scanning direction, a light beam deflector is configured to deflect the converged light beams from the second optical unit by intersection with reflecting planes situated at least at the vicinity of the position of formation of the line image, and a third optical unit is configured to converge the light beams deflected by the light beam deflector into a spot formed on the surface to be scanned, in which the third optical unit includes of a first anamorphic optical element, L1, and a second anamorphic optical element, L2, each having a positive power along the horizontal direction and the vertical scanning directions, respectively, and the magnification of the third optical unit is made approximately constant irrespective of deflection angle and the power of the first anamorphic optical element L1 is also made approximately constant irrespective of deflection angle.

In addition, the light beam scanning apparatus is adjusted to satisfy the relation, $0 \leq \Delta P1/\Delta P2 < 0.1$, where P1 and P2 are powers in the vertical scanning direction for the first anamorphic optical element L1 and the second anamorphic optical element L2, respectively, and $\Delta P1$ and $\Delta P2$ are the differences between the maximum and minimum values of P1 and P2, respectively.

In another aspect of the invention, the curvature of the cross section of the first anamorphic optical element L1 included in the light beam scanning apparatus varies independently of the shape thereof in the horizontal scanning direction. In addition, the curvature of the cross section of the second anamorphic optical element L2 varies independently of the shape thereof in the horizontal scanning direction.

In yet another aspect of the invention, the second anamorphic optical element L2 is formed having a specified surface shape with the curvature of its cross section depending on the position in the vertical scanning direction such that the magnification of the third optical unit is approximately constant irrespective of deflection angle.

In another aspect of the invention, at least one of the first and second anamorphic optical elements, L1 and L2, is formed with a specified surface shape such that the curvature of its cross section in the vertical scanning direction varies independently of its shape in the horizontal scanning direction and that the shape varies asymmetrically depending on the position in the horizontal scanning direction.

In addition, at least one of surfaces of the first and second anamorphic optical elements, L1 and L2, is formed to be in the form of noncircular arc.

In another aspect of the invention, the lateral magnification, $\beta(0)$, in the vertical scanning direction on the optical axis of the third optical unit satisfies the relation, $0.5 < |\beta(0)| < 1.5$. In addition, lateral magnifications, $\beta(0)$ and $\beta(\theta)$, in the vertical scanning direction of the third optical unit on the optical axis and at a deflection angle, $\theta$, from the optical axis, respectively, satisfy the relation, $0.8 < |\beta(\theta)/\beta(0)| < 1.2$.

In another aspect, the light source may be a multiple-beam light source which emits multiple fluxes of light beams.

An image forming system is also disclosed herein as incorporating anyone of the optical units recited herein above.

Further aspects of the present invention and the manner in which it addresses the above problems, as well as others, will become more readily apparent from the following detailed description when taken in conjunction with the accompanying drawings, detailed description, and claims.

DESCRIPTION OF THE PREFERRED EMBODIMENTS

In the detailed description which follows, specific embodiments of a light beam scanning apparatus provided with anamorphic optical units are described, being capable of reducing the change in beam spot diameter during vertical beam scanning in use for electrophotographic imaging. It is understood, however, the present disclosure is not limited to these embodiments. For example, it is appreciated that this method of light beam scanning may also be adaptable to any form of apparatuses including a beam scanning unit. Other embodiments will be apparent to those skilled in the art upon reading the following description.

Figure 1:
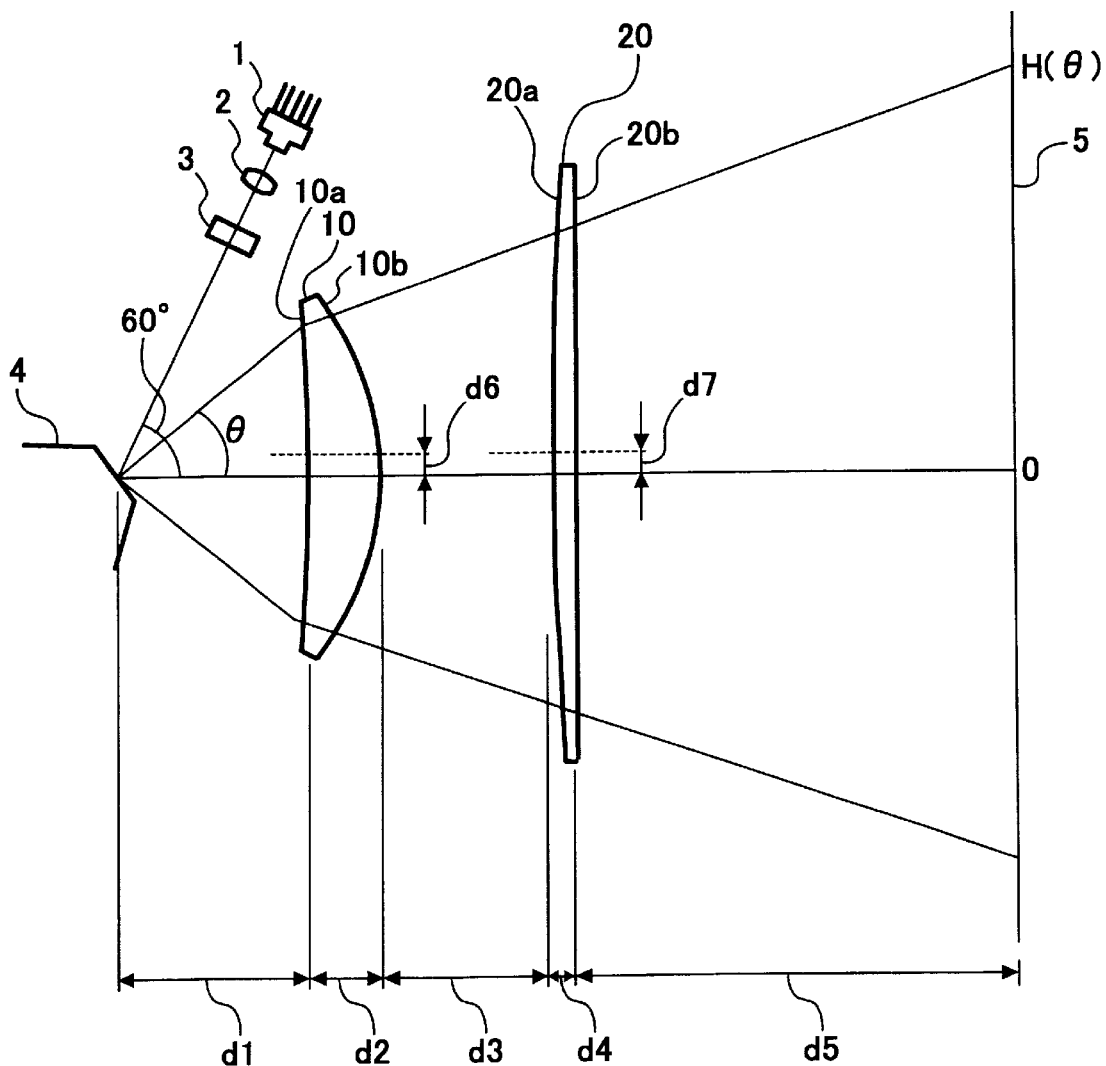
FIG. 1 is a schematic view illustrating a light beam scanning apparatus according to embodiments disclosed herein.

FIG. 1 is a schematic drawing illustrating a light beam scanning apparatus disclosed herein.

Referring to FIG. 1, light beams emitted by a light source 1 are coupled to a desired beam shape through a coupling lens 2, in which approximately parallel beams are utilized herein. As to the light source 1, there exemplified are a laser diode (LD), a laser diode array (LDA) consisting of multiple light emitting point sources, and a multiple-beam source synthesized of an LD beam by means of a prism or similar optical unit. If the multiple light source is used, this facilitates for decreasing the number of rotation of light beam deflector, which may implement the decrease in power consumption as well as prolonged life of the light deflector.

As to the coupling lens 2, a single aspherical lens is suitably used, for which the wavefront aberration is properly corrected. Light beams emerging from the coupling lens 2 converge into a line image through a cylindrical lens 3 with its focal power only along the vertical scanning direction, and subsequently deflected by a light beam deflector 4 located at the position of the above formed line image.

The deflected light beams are then subjected to the corrections for several optical properties such as, for example, image surface curvature and f·θ characteristics with respect to the horizontal (i.e., main) scanning direction and the vertical scanning direction, by means of a third optical unit consisting of a first anamorphic optical element 10 (L1) and a second anamorphic optical element 20 (L2), respectively, each having a positive power along the horizontal direction and primarily vertical scanning direction; and subsequently image-formed onto a surface 5 to be scanned presently.

The magnification of the third optical unit consisting of a first anamorphic optical element 10 (L1) and a second anamorphic optical element 20 (L2), each having a positive power along the horizontal and primarily vertical scanning directions, respectively, is herein designed to be approximately constant irrespective of deflection angle θ over the range presently considered. In addition, the power of the first anamorphic optical element 10 (L1) in the vertical scanning direction is also designed to be approximately constant irrespective of the deflection angle θ.

Figure 2:
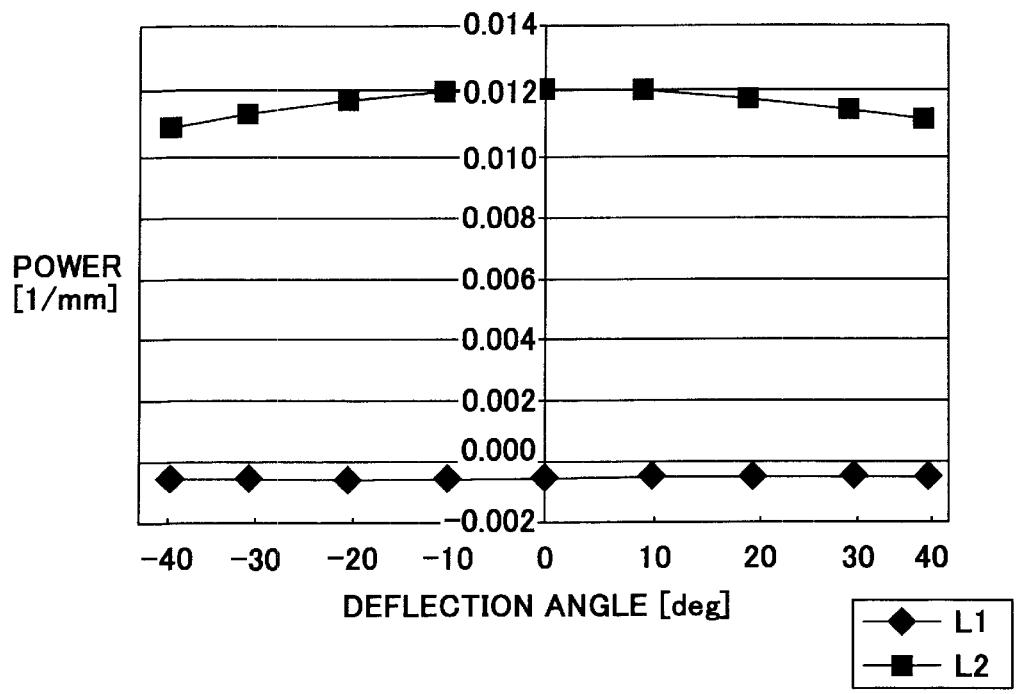
FIG. 2 plots the power P, vertically, versus the defection angle θ, horizontally, comparing the first and second anamorphic optical elements, L1 and L2, according to a first embodiment disclosed herein.

FIG. 2 plots the power P, vertically, versus the defection angle θ, horizontally, comparing the first and second anamorphic optical elements, L1 and L2, according to a first embodiment disclosed herein.

Numerical values suitably used to specify the shape of the anamorphic optical elements will be detailed in the later section of Example 1.

These results shown in FIG. 2 with respect to the power P versus the defection angle θ relation are also shown numerically in Table 1.

TABLE 1

| Deflection angle [deg] | P1 | P2 | Magnification power along vertical scanning direction |
|---|---|---|---|
| 38 | −4.917E−04 | 1.092E−02 | −0.844 |
| 30 | −4.827E−04 | 1.128E−02 | −0.873 |
| 20 | −4.966E−04 | 1.164E−02 | −0.901 |

TABLE 1-continued

| | | | |
|---|---|---|---|
| 10 | −4.973E−04 | 1.185E−02 | −0.919 |
| 0 | −4.896E−04 | 1.191E−02 | −0.921 |
| −10 | −4.966E−04 | 1.183E−02 | −0.909 |
| −20 | −4.968E−04 | 1.160E−02 | −0.886 |
| −30 | −4.827E−04 | 1.123E−01 | −0.855 |
| −38 | −4.862E−04 | 1.086E−02 | −0.826 |

| $\Delta P1$ | $\Delta P2$ | $\Delta P1/\Delta P2$ |
|---|---|---|
| 1.461E−05 | 1.047E−03 | 1.395E−02 |

There is shown in Table 1 are the values of the powers, P1 and P2, for the first anamorphic optical element L1 and second anamorphic optical element L2, respectively, as a function of the deflection angle $\theta$.

It is indicated from the results that the change in the L1 power is approximately constant with a variation of within 3% at most. In addition, the change of the magnification power along vertical scanning direction shown in Table 1 is approximately in the order of 10%, which is within the range allowable in practical applications.

By forming the beam scanning apparatus with the thus corrected optical units, the undue change in beam spot diameter in the vertical scanning direction, which is caused by a large image height, can be alleviated, yet reducing undesirable increase in aberration caused by possible errors at fabrication or assembly steps.

It may be added that the parameter, $\Delta P1$, designates the difference between the maximum and minimum P1 values. Similarly, the $\Delta P1$ parameter designates the difference for the P2 values.

By bringing the parameter, $\Delta P1/\Delta P2$, to satisfy the relation, $0 \leq \Delta P1/\Delta P2 < 0.1$, the abovementioned undue change in beam spot diameter in the vertical scanning direction, which is caused by a large image height, can also be alleviated properly, yet reducing undesirable increase in aberration caused by possible errors at fabrication or assembly steps.

The first anamorphic optical element L1 having a positive power along the horizontal scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the power of the first anamorphic optical element L1 in the vertical scanning direction can be made approximately constant irrespective of the deflection angle $\theta$, yet making the magnification of the third optical unit to be approximately constant irrespective of the deflection angle $\theta$ presently considered.

As a result, the undue change in beam spot diameter in the vertical scanning direction, which is caused by a large image height, can be alleviated properly; yet reducing again undesirable increase in aberration caused by possible errors at fabrication or assembly steps.

The second anamorphic optical element L2 having a positive power primarily along the vertical scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the magnification of the third optical unit is made to be approximately constant irrespective of the deflection angle $\theta$ presently considered.

As a result, the undue change in beam spot diameter in the vertical scanning direction, which is caused by a large image height, can be alleviated properly.

In addition, the second anamorphic optical element L2 having a positive power primarily along the vertical scanning direction, is formed having a specified surface shape with the curvature of the cross section thereof depending on the position in the vertical scanning direction such that the magnification of the third optical unit is approximately constant irrespective of deflection angle $\theta$ presently considered.

With the thus formed optical element, design flexibility for the element increases, its aberration is properly corrected, and the undue change in beam spot diameter in the vertical scanning direction, which is caused by a large image height, can be alleviated properly.

Furthermore, at least one of the first and second anamorphic optical elements, L1 and L2, is formed with a specified surface shape such that the curvature of its cross section in the vertical scanning direction varies independently of its shape in the horizontal scanning direction and that the shape varies asymmetrically depending on the scanning position in the horizontal scanning direction.

With the thus formed optical elements having the shape varying asymmetrically depending on the scanning position in the horizontal scanning direction, the slanting of image surface curvature in the vertical scanning direction can be effectively corrected, which is caused by the sag (i.e., undue shift of the point of reflection depending on deflection angle) generated by the deflector 4.

In addition, at least one of the surfaces of the first and second anamorphic optical elements, L1 and L2, is formed to be in the form of non-circular arc.

As result, the wavefront aberration in the vertical scanning direction can be effectively corrected, and a previous difficulty in focusing the beam spot as small as in the order of 30 $\mu$m in diameter, can be alleviated.

Figure 3:
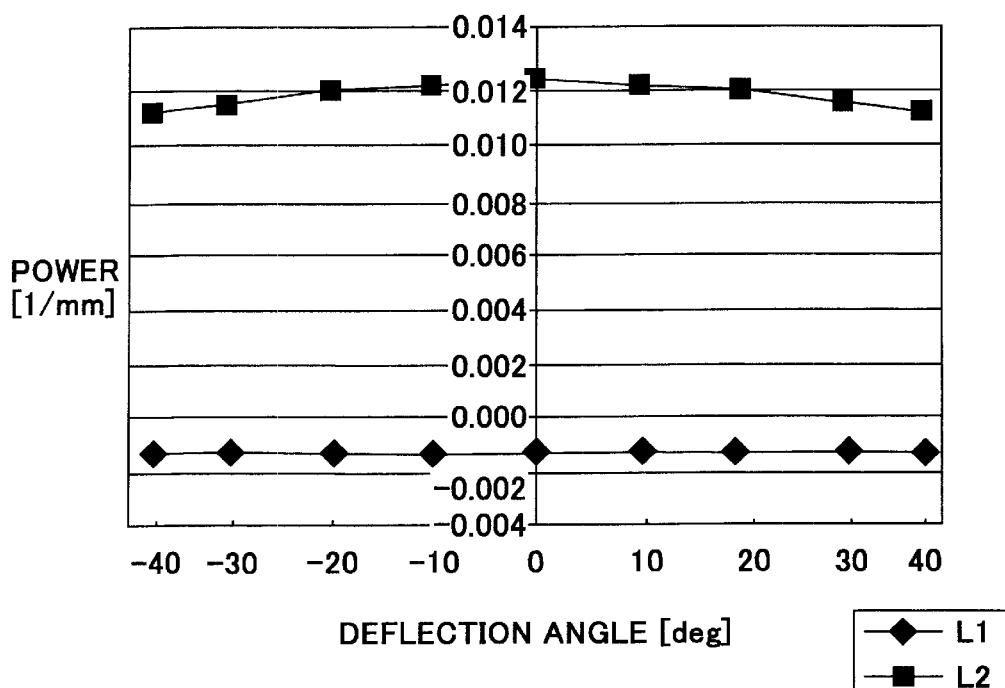
FIG. 3 plots the power P versus the defection angle θ, comparing the first and second anamorphic optical elements, L1 and L2, according to a second embodiment disclosed herein.

FIG. 3 plots the power P, vertically, versus the defection angle $\theta$, horizontally, comparing the first and second anamorphic optical element, L1 and L2, according to a second embodiment disclosed herein.

Numerical values suitably used to specify the shape of the anamorphic optical elements will be detailed in the later section of Example 2.

These results shown in FIG. 3 with respect to the power P versus the defection angle $\theta$ relation are also shown numerically in Table 2.

TABLE 2

| Deflection angle [deg] | P1 | P2 | Magnification power along vertical scanning direction |
|---|---|---|---|
| 38 | −1.313E−03 | 1.110E−02 | −0.815 |
| 30 | −1.314E−03 | 1.146E−02 | −0.844 |
| 20 | −1.336E−03 | 1.183E−02 | −0.873 |
| 10 | −1.333E−03 | 1.204E−02 | −0.890 |
| 0 | −1.322E−03 | 1.211E−02 | −0.894 |
| −10 | −1.331E−03 | 1.203E−02 | −0.881 |

TABLE 2-continued

| | | | |
|---|---|---|---|
| −20 | −1.335E−03 | 1.179E−02 | −0.858 |
| −30 | −1.314E−03 | 1.141E−01 | −0.825 |
| −38 | −1.309E−03 | 1.105E−02 | −0.796 |
| ΔP1 | | ΔP2 | ΔP1/ΔP2 |
| 2.695E−05 | | 1.063E−03 | 2.535E−02 |

There shown in Table 2 are the values of the powers, P1 and P2, for the first anamorphic optical element L1 and second anamorphic optical element L2, respectively, as a function of the deflection angle θ.

It is indicated from the results that the change in the L1 power is approximately constant with a variation of approximately 2%. In addition, the change of the magnification power along vertical scanning direction shown in Table 2 is approximately in the order of 10%, which is within the range allowable in practical applications.

By forming the beam scanning apparatus with the thus corrected optical units, the undue change in beam spot diameter in the vertical scanning direction, which is caused by a large image height, can be alleviated, yet reducing undesirable increase in aberration caused by possible errors at fabrication or assembly steps.

It may be added that the parameter, ΔP1, designates the difference between the maximum and minimum P1 values. Similarly, the ΔP1 parameter designates the difference for the P2 values.

By bringing the parameter, ΔP1/ΔP2, to satisfy the relation, $0 \leq \Delta P1/\Delta P2 < 0.1$, the abovementioned undue change in beam spot diameter in the vertical scanning direction, which is caused by a large image height, can also be alleviated properly, yet reducing undesirable increase in aberration caused by possible errors at fabrication or assembly steps.

The first anamorphic optical element L1 having a positive power along the horizontal scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the power of the first anamorphic optical element L1 in the vertical scanning direction can be formed to be approximately constant irrespective of the deflection angle θ, yet making the magnification of the third optical unit to be approximately constant irrespective of the deflection angle θ presently considered.

As a result, the undue change in beam spot diameter in the vertical scanning direction, which is caused by a large image height, can be alleviated properly; yet reducing undesirable increase in aberration caused by possible errors at fabrication or assembly steps.

The second anamorphic optical element L2 having a positive power primarily along the vertical scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the magnification of the third optical unit is made to be approximately constant irrespective of the deflection angle θ presently considered.

As a result, the undue change in beam spot diameter in the vertical scanning direction, which is caused by a large image height, can be alleviated properly.

The second anamorphic optical element L2 having a positive power primarily along the vertical scanning direction, is formed with a specified shape of its cross section in the vertical scanning direction such that the magnification of the third optical unit is approximately constant irrespective of the deflection angle θ presently considered.

With the thus formed optical element, design flexibility for the element increases, its aberration is properly corrected, and the undue change in beam spot diameter in the vertical scanning direction, which is caused by a large image height, can be alleviated properly.

In addition, at least one of the first and second anamorphic optical elements, L1 and L2, is formed with a specified surface shape such that the curvature of its cross section in the vertical scanning direction varies independently of its shape in the horizontal scanning direction and that the shape varies asymmetrically to the left and right sides depending on the scanning position in the horizontal scanning direction.

With the thus formed optical elements having the shape varying asymmetrically depending on the scanning position in the horizontal scanning direction, the slanting of image surface curvature in the vertical scanning direction can be effectively corrected, which is caused by the sag generated by the deflector 4.

Furthermore, at least one of the surfaces of the first and second anamorphic optical elements, L1 and L2, is formed to be in the form of non-circular arc.

As result, the wavefront aberration in the vertical scanning direction can be effectively corrected, and a previous difficulty in focusing the beam spot as small as in the order of 30 μm in diameter, can be alleviated.

Figure 4:
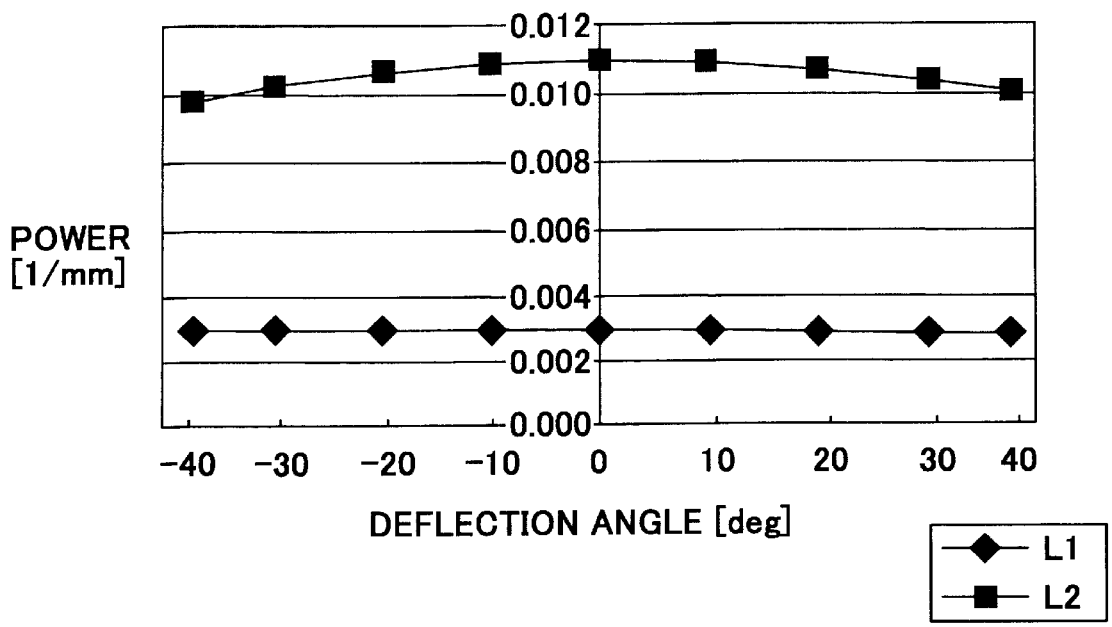
FIG. 4 plots the power P, vertically, versus the defection angle θ, comparing the first and second anamorphic optical elements, L1 and L2, according to a third embodiment disclosed herein.

FIG. 4 plots the power P, vertically, versus the defection angle θ, horizontally, comparing the first and second anamorphic optical elements, L1 and L2, according to a third embodiment disclosed herein.

Numerical values suitably used to specify the shape of the anamorphic optical elements will be detailed in the later section of Example 3.

These results shown in FIG. 4 with respect to the power P versus the defection angle θ relation are also shown numerically in Table 3.

TABLE 3

| Deflection angle [deg] | P1 | P2 | Magnification power along vertical scanning direction |
|---|---|---|---|
| 38 | 2.748E−03 | 1.010E−02 | −0.985 |
| 30 | 2.699E−03 | 1.031E−02 | −1.005 |
| 20 | 2.702E−03 | 1.054E−02 | −1.026 |
| 10 | 2.710E−03 | 1.068E−02 | −1.040 |
| 0 | 2.722E−03 | 1.072E−02 | −1.043 |
| −10 | 2.721E−03 | 1.066E−02 | −1.033 |
| −20 | 2.722E−03 | 1.049E−02 | −1.015 |
| −30 | 2.730E−03 | 1.023E−01 | −0.991 |

TABLE 3-continued

| | | | |
|---|---|---|---|
| −38 | 2.750E−03 | 1.001E−02 | −0.974 |
| ΔP1 | | ΔP2 | ΔP1/ΔP2 |
| 5.133E−05 | | 7.138E−04 | 7.191E−02 |

There is shown in Table 3 are the values of the powers, P1 and P2, for the first anamorphic optical element L1 and second anamorphic optical element L2, respectively, as a function of the deflection angle θ.

It is indicated from the results that the change in the L1 power is approximately constant with a variation of approximately 2%. In addition, the change of the magnification power along vertical scanning direction shown in Table 2 is approximately, in the order of 10%, which is within the range allowable in practical applications.

By forming the beam scanning apparatus with the thus corrected optical units, the undue change in beam spot diameter in the vertical scanning direction, which is caused by a large image height, can be alleviated, yet reducing undesirable increase in aberration caused by possible errors at fabrication or assembly steps.

It may be added that the parameter, ΔP1, designates the difference between the maximum and minimum P1 values. Similarly, the ΔP1 parameter designates the difference for the P2 values.

By bringing the parameter, ΔP1/ΔP2, to satisfy the relation, $0 \leq \Delta P1/\Delta P2 < 0.1$, the abovementioned undue change in beam spot diameter in the vertical scanning direction, which is caused by a large image height, can also be alleviated properly, yet reducing undesirable increase in aberration caused by possible errors at fabrication or assembly steps.

The first anamorphic optical element L1 having a positive power along the horizontal scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the power of the first anamorphic optical element L1 in the vertical scanning direction can be formed to be approximately constant irrespective of the deflection angle θ, yet making the magnification of the third optical unit to be approximately constant irrespective of the deflection angle θ presently considered.

As a result, the undue change in beam spot diameter in the vertical scanning direction, which is caused by a large image height, can be alleviated properly; yet reducing undesirable increase in aberration caused by possible errors at fabrication or assembly steps.

The second anamorphic optical element L2 having a positive power primarily along the vertical scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected. In addition, the magnification of the third optical unit is made to be approximately constant over the entire range of the deflection angle θ presently considered.

As a result, the undue change in beam spot diameter in the vertical scanning direction, which is caused by a large image height, can be alleviated properly.

In addition, the second anamorphic optical element L2 having a positive power primarily along the vertical scanning direction, is formed with a specified surface shape in the vertical scanning direction such that the magnification of the third optical unit is approximately constant over the entire range of the deflection angle θ presently considered.

With the thus formed optical element, design flexibility for the element increases, its aberration is properly corrected, and the undue change in beam spot diameter in the vertical scanning direction, which is caused by a large image height, can be alleviated properly.

Furthermore, at least one of the first and second anamorphic optical elements, L1 and L2, is formed with a specified surface shape such that the curvature of its cross section in the vertical scanning direction varies independently of its shape in the horizontal scanning direction and that its shape varies asymmetrically depending on the scanning position in the horizontal scanning direction.

With the thus formed optical elements having the shape varying asymmetrically depending on the scanning position in the horizontal scanning direction, the slanting of image surface curvature in the vertical scanning direction can be effectively corrected, which is caused by the sag generated by the deflector 4.

In addition, at least one of the surfaces of the first and second anamorphic optical elements, L1 and L2, is formed to be in the form of non-circular arc.

As result, the wavefront aberration in the vertical scanning direction can be effectively corrected, and a previous difficulty in focusing the beam spot as small as in the order of 30 μm in diameter, can be alleviated.

Figure 5:
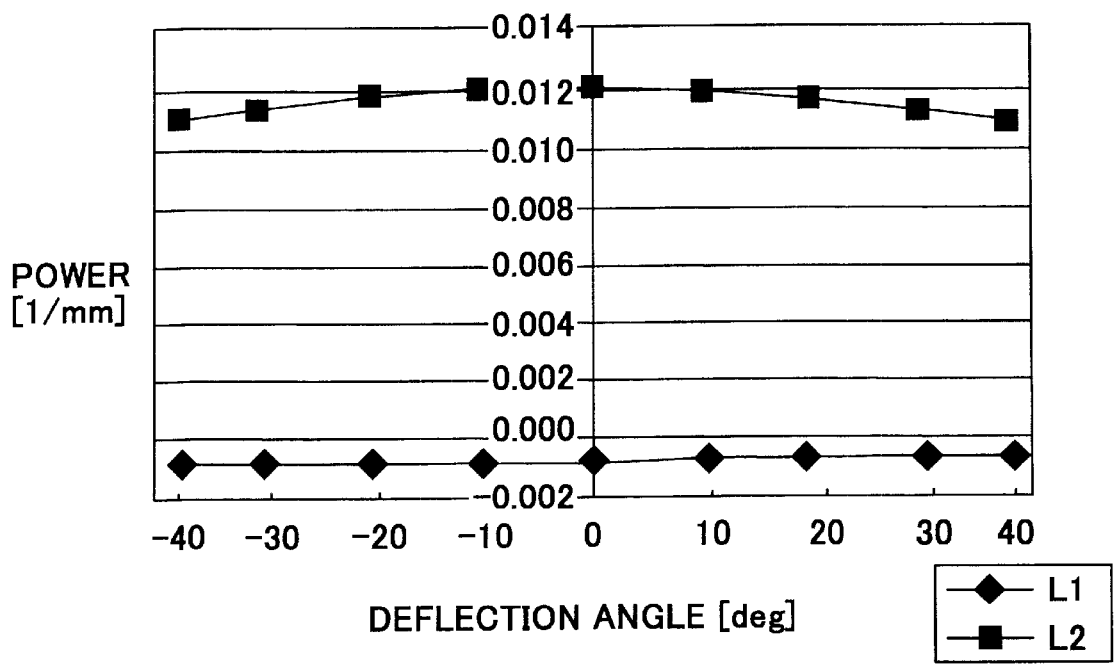
FIG. 5 plots the power P, vertically, versus the defection angle θ, comparing the first and second anamorphic optical elements, L1 and L2, according to a fourth embodiment disclosed herein.

FIG. 5 plots the power P, vertically, versus the deflection angle θ, horizontally, comparing the first and second anamorphic optical elements, L1 and L2, according to a fourth embodiment disclosed herein.

Numerical values suitably used to specify the shape of the anamorphic optical elements will be detailed in the later section of Example 4.

These results shown in FIG. 5 with respect to the power P versus the deflection angle θ relation are also shown numerically in Table 4.

TABLE 4

| Deflection angle [deg] | P1 | P2 | Magnification power along vertical scanning direction |
|---|---|---|---|
| 38 | −8.102E−04 | 1.082E−02 | −0.883 |
| 30 | −8.088E−04 | 1.131E−02 | −0.896 |
| 20 | −8.113E−04 | 1.174E−02 | −0.912 |
| 10 | −8.244E−04 | 1.195E−02 | −0.922 |
| 0 | −8.245E−04 | 1.204E−02 | −0.922 |
| −10 | −8.208E−04 | 1.198E−02 | −0.913 |
| −20 | −8.103E−04 | 1.178E−02 | −0.897 |
| −30 | −8.081E−04 | 1.139E−02 | −0.878 |
| −38 | −8.080E−04 | 1.100E−02 | −0.867 |
| ΔP1 | | ΔP2 | ΔP1/ΔP2 |
| 1.646E−05 | | 1.226E−03 | 1.342E−02 |

There shown in Table 4 are the values of the powers, P1 and P2, for the first anamorphic optical element L1 and second anamorphic optical element L2, respectively, as a function of the deflection angle θ.

It is indicated from the results that the change in the L1 power is approximately constant with a variation of approximately 2%. In addition, the change of the magnification power along vertical scanning direction shown in Table 2 is approximately in the order of 10%, which is within the range allowable in practical applications.

By forming the beam scanning apparatus with the thus corrected optical units, the undue change in beam spot diameter in the vertical scanning direction, which is caused by a large image height, can be alleviated, yet reducing undesirable increase in aberration caused by possible errors at fabrication or assembly steps.

It may be added that the parameter, ΔP1, designates the difference between the maximum and minimum P1 values. Similarly, the ΔP1 parameter designates the difference for the P2 values.

By bringing the parameter, ΔP1/ΔP2, to satisfy the relation, $0 \leq \Delta P1/\Delta P2 < 0.1$, the abovementioned undue change in beam spot diameter in the vertical scanning direction, which is caused by a large image height, can also be alleviated properly, yet reducing undesirable increase in aberration caused by possible errors at fabrication or assembly steps.

The first anamorphic optical element L1 having a positive power along the horizontal scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the power of the first anamorphic optical element L1 in the vertical scanning direction can be formed to be approximately constant irrespective of the deflection angle θ, yet making the magnification of the third optical unit to be approximately constant irrespective of the deflection angle θ presently considered.

As a result, the undue change in beam spot diameter in the vertical scanning direction, which is caused by a large image height, can be alleviated properly; yet reducing undesirable increase in aberration caused by possible errors at fabrication or assembly steps.

The second anamorphic optical element L2 having a positive power primarily along the vertical scanning direction, is formed with a specified surface shape in the vertical scanning direction such that the curvature of its cross section varies independently of its shape in the horizontal scanning direction.

With the thus formed optical element, design flexibility for the element increases and its aberration is properly corrected, and the magnification of the third optical unit is made to be approximately constant irrespective of the deflection angle θ presently considered.

As a result, the undue change in beam spot diameter in the vertical scanning direction, which is caused by a large image height, can be alleviated properly.

The second anamorphic optical element L2 having a positive power primarily along the vertical scanning direction, is formed with a specified surface shape in the vertical scanning direction such that the magnification of the third optical unit is approximately constant over the entire range of the deflection angle θ presently considered.

With the thus formed optical element, design flexibility for the element increases, its aberration is properly corrected, and the undue change in beam spot diameter in the vertical scanning direction, which is caused by a large image height, can be alleviated properly.

In addition, at least one of the first and second anamorphic optical elements, L1 and L2, is formed with a specified surface shape such that the curvature of its cross section in the vertical scanning direction varies independently of its shape in the horizontal scanning direction and that its shape varies asymmetrically depending on the scanning position in the horizontal scanning direction.

With the thus formed optical elements having the shape varying asymmetrically depending on the scanning position in the horizontal scanning direction, the slanting of image surface curvature in the vertical scanning direction can be effectively corrected, which is caused by the sag generated by the deflector 4.

Furthermore, at least one of the surfaces of the first and second anamorphic optical elements, L1 and L2, is formed to be in the form of non-circular arc.

As result, the wavefront aberration in the vertical scanning direction can be effectively corrected, and a previous difficulty in focusing the beam spot as small as in the order of 30 μm in diameter, can be alleviated.

In the fourth embodiment, in particular, sub-noncircular arcs are used for forming the second surface of the second anamorphic optical element L2.

Figure 11:
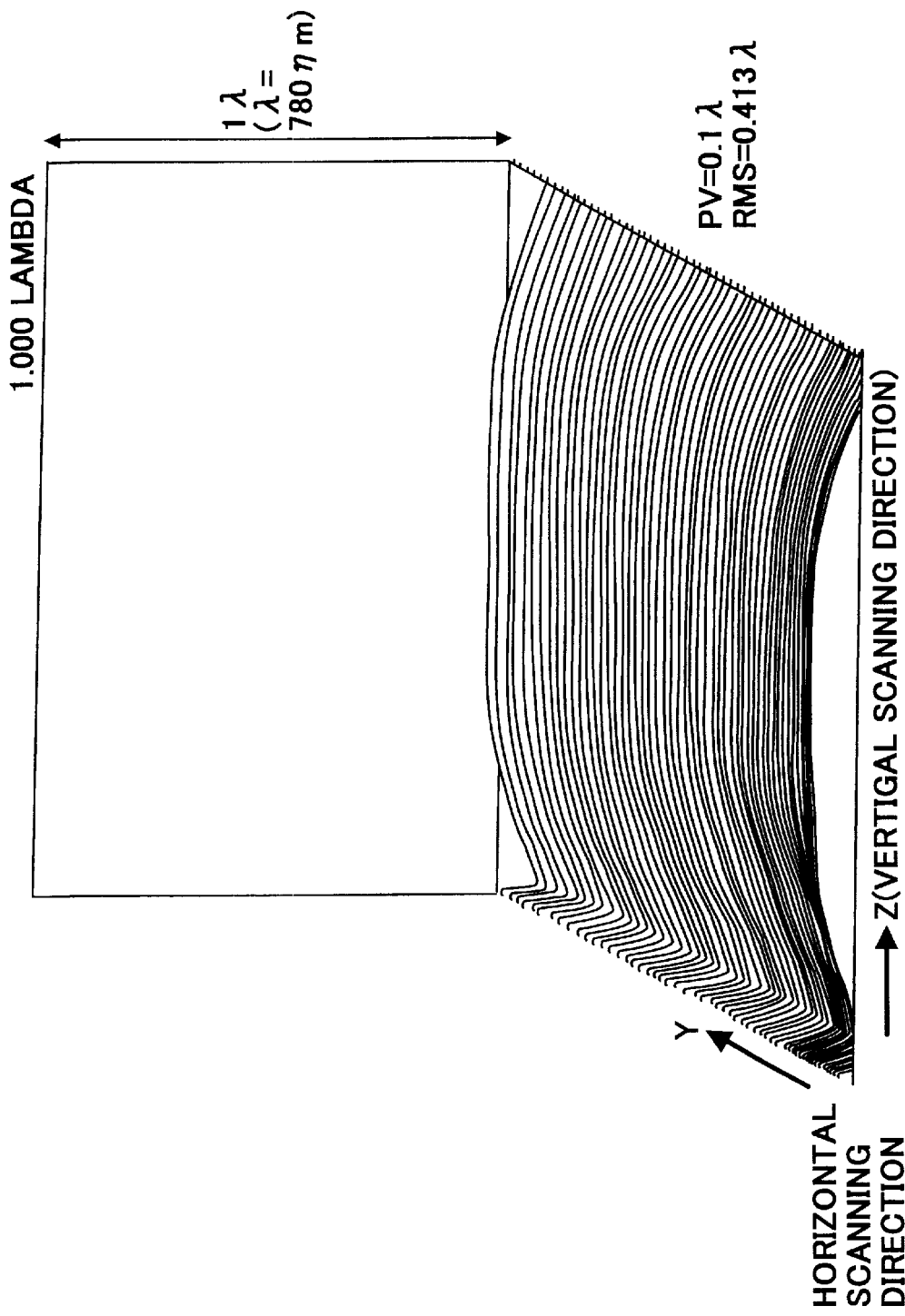
FIG. 11 is a wavefront aberration chart on the optical axis (i.e., at the deflection angle 0) according to the fourth embodiment disclosed herein.

The wavefront aberration on the optical axis (i.e., at the deflection angle 0) obtained in the fourth embodiment is shown in FIG. 11. In addition, there shown in FIG. 11 is the wavefront aberration for the second surface of the second anamorphic optical element L2, which is formed as a circular arc defined by removing the terms, $Z\hat{\ } 4$ and $Z\hat{\ } 6$, from the expression for defining the sub-noncircular arcs.

It is clearly shown that the amount of the wavefront aberration is improved approximately to one-half by using the noncircular arcs.

In addition, the third optical unit can be formed with two optical elements in place of three or more elements, which facilitates to reduce product costs and cumulative errors during fabrication and assembly steps.

To be more specific, by forming the third optical unit with two lenses, for example, the deterioration in the wavefront aberration (i.e., the occurrence of the coma-aberration) can be reduced, which is generally caused by the decentering which is otherwise carried out for properly separating the beam flux as in the case using a reflection type imaging unit.

Also in the fourth embodiment, the lateral magnification, β(0), in a vertical scanning direction on the optical axis of the third optical unit is brought to satisfy the relation, $0.5 < |\beta(0)| < 1.5$.

For the β(0) value smaller than 0.5, the optical elements have to be made larger because of its proximity to the beam scanning surface, to thereby yield in the increase in overall size of the scanning apparatus. For the β(0) value larger than 1.5, in contrast, the optical elements get smaller because of its proximity to the deflecting unit. However, this may result in larger deterioration in the aberration caused by cumulative errors during fabrication and assembly steps.

By bringing the value of β(0) in the range as specified above, undesirable increase in the size of optical elements is alleviated and undue increase in aberration caused by possible errors at fabrication or assembly steps can be reduced.

In addition, lateral magnifications, β(0) and β(θ), in the vertical scanning direction of the third optical unit on the optical axis and at a deflection angle θ from the optical axis, respectively, is brought to satisfy the relation, $0.8 < |\beta(\theta)/\beta(0)| < 1.2$.

With this adjustment, undue changes can be obviated in the distance between neighboring scanning lines and the distance can remain approximately constant irrespective of the deflection angle. This is particularly effective in the case of the multiple-beam light source such as an LDA consisting of multiple light emitting point sources, and a multiple-beam source synthesized of an LD beam by means of a prism or other similar optical units.

The multiple-beam light source is formed in the present disclosure as exemplified by the above mentioned LDA consisting of multiple light emitting point sources and a multiple-beam source synthesized of an LD beam by a prism or similar optical unit, which is quite useful for decreasing the number of rotation of light beam deflector. This facilitates to decrease power consumption as well as prolonged life of the light deflector.

Furthermore, an image forming system is also provided suitably incorporating various optical units and elements recited in the present disclosure, to thereby facilitate to form stable electrostatic latent images in the image forming system.

Having described the construction of the third optical unit, the shape of the optical elements incorporated into the optical unit will be detailed herein below, starting with the expression for defining noncircular arcs in the horizontal scanning direction.

The surface shape of the optical elements is generally in the form of noncircular arcs, which is adequately described by the following polynomial expression, where the depth, X, along the optical axis; the distance, Y, from the optical axis along the horizontal scanning direction; paraxial radius of curvature, Rm, in the plane of the horizontal scanning direction on the optical axis; coefficients for the higher order terms, A1, A2, A3, A4, A5, A6, . . . ; and conical constant, K.

$$X = (Y^2/Rm)/[1 + \sqrt{\{1-(1+K)(Y/Rm)^2\}}] + A1 \cdot Y + A2 \cdot Y^2 + A3 \cdot Y^3 + A4 \cdot Y^4 + 5 \cdot Y^5 + A6 \cdot Y^6$$

If the coefficients of odd-numbered terms, A1, A3, A5, . . . , are substituted by non-zero numbers, the form specified by the expression becomes asymmetric with respect to the horizontal scanning direction. Since only even-numbered terms with coefficients, A2, A4, A6, . . . , are used in the present embodiments 1 through 4, the shape of the optical elements becomes symmetric in the horizontal scanning direction.

Next, the expression for defining noncircular arcs in the vertical scanning direction will be described. The surface shape of the optical element at a distance Y from the optical axis in the vertical scanning direction is adequately defined by the following polynomial expression, where Y is the coordinate along the horizontal scanning direction and Z is the coordinate along the vertical scanning direction.

$$fs(Y,Z) = (Z^2 \cdot Cs(Y))/[1+\sqrt{\{1-(1+Ks(Y))(Z \cdot Cs(Y))^2\}}]$$
$$+(F0+F1 \cdot Y+F2 \cdot Y^2+F3 \cdot Y^3+F4 \cdot Y^4+ \ldots)Z$$
$$+(G0+G1 \cdot Y+G2 \cdot Y^2+G3 \cdot Y^3+G4 \cdot Y^4+ \ldots)Z^2$$
$$+(H0+H1 \cdot Y+H2 \cdot Y^2+H3 \cdot Y^3+H4 \cdot Y^4+ \ldots)Z^3$$
$$+(I0+I1 \cdot Y+I2 \cdot Y^2+I3 \cdot Y^3+I4 \cdot Y^4+ \ldots)Z^4$$
$$+(J0+J1 \cdot Y+J2 \cdot Y^2+J3 \cdot Y^3+J4 \cdot Y^4+ \ldots)Z^5+ \qquad (2).$$

In the first term on the right-hand side of the expression, $$Cs(Y) = (1/Rs0) + B1 \cdot Y + B2 \cdot Y^2 + B3 \cdot Y^3 + B4 \cdot Y^4 + B5 \cdot Y^5 + \qquad (3),$$

$$Ks(Y) = Ks0 + C1 \cdot Y + BC \cdot Y^2 + C3 \cdot Y^3 + C4 \cdot Y^4 + C5 \cdot Y^5 + \qquad (4),$$

where $Cs(Y)$ is a paraxial curvature of cross section at the coordinate, Y, in the vertical scanning direction; $Ks(Y)$ is a conical constant of cross section at the coordinate, Y, in the vertical scanning direction, and Rs0 is a paraxial radius of curvature of cross section in the vertical scanning direction including the optical axis (X=0).

If the coefficients of odd-numbered terms for the Y expression, B1, B3, B5, . . . are substituted by non-zero numbers, the radius of curvature of the form specified by the expression becomes asymmetric with respect to the horizontal scanning direction.

It may be noted in this context that, if Z=0 is substituted in the expression (2), the relation, fs (Y, 0)=0, is obtained, which is deduced to the aforementioned expression (1) on the cross sectional surface in the horizontal scanning direction. Accordingly, the three-dimensional form of the surface shape is specified by the sum of the expressions (1) and (2).

Having generally described the present disclosure, the Examples 1 through 4 are detailed herein below including numerical values suitably used to specify the shape of optical elements incorporated into the light beam scanning apparatus, which correspond to the first through fourth embodiments, respectively, described earlier.

EXAMPLE 1

An optical scanning apparatus was fabricated incorporating a laser diode (LD) device as a light source having emissions at a wavelength of 780 nm, and a lens with a focal length of 27 mm as a coupling lens which serves for collimating laser beams. A polygonal mirror used herein had five reflecting faces provided so as to be inscribed by a circle having a radius of 18 mm. The beam scanning was carried out such that the angle between the direction of light beam incidence and the optical axis of beam scanning was 60°, with ±150 mm width of beam writing, and ±38° width of scanning angle.

In addition, the elements included in the scanning unit of FIG. 1 were adjusted to have distances such as d1=71.6 mm, d2=30 mm, d3=66.32 mm, d4=8.5 mm, d5=159.345 mm, d6=0.274 mm, and d7=0.274 mm.

The reflectivity for respective lenses, 10 and 20, was found as 1.523978 ($\lambda$=780 nm at 25° C.).

There shown herein below are several sets of parameters which are suitably used for specifying the shape of the surface of anamorphic optical elements, L1 and L2, in which 10a and 10b designate the surfaces of the element L1 (FIG. 1) opposing to the beam deflector 4 and the photoreceptor 5, respectively, while 20a and 20b designate the surfaces of the element L2 opposing to the beam deflector 4 and the photoreceptor 5, respectively.

The parameters suitable for specifying the shape of 10a;
Pm=−1030.233346, Rs=−90.423157
A00 −4.041619E+02
A04 6.005017E−08
A06 −7.538155E−13
A08 −4.036824E−16
A10 4.592164E−20
A12 −2.396524E−24
B02 4.569621E−07
B04 −7.269420E−11
B06 −2.742376E−14
B08 −2.247470E−18
B10 1.081308E−23
The parameters suitable for specifying the shape of 10b;
Pm=−109.082474, Rs=−110.038458
A00 −5.427642E−01
A04 9.539024E−08
A06 4.882194E−13
A08 −1.198993E−16
A10 5.029989E−20
A12 −5.654269E−24
B0 −9.090081E−08
B02 −4.717025E−07
B03 4.838215E−11
B04 −8.464538E−11
B05 3.927505E−14
B06 8.104561E−15
B07 −2.932558E−19
B08 −2.004113E−19
B09 −7.504837E−22
B10 −1.411586E−21
The parameters suitable for specifying the shape of 20a;
Rm=1493.654587, Rs=−69.099723
A00 5.479389E+01
A04 −7.606757E−09
A06 −6.311203E−13
A08 6.133813E−17
A10 −1.482144E−21
A12 2.429275E−26
A14 −1.688771E−30
B02 −4.232444E−08
B04 2.350202E−11
B06 −1.860155E−15
B08 1.482961E−20
B10 2.785776E−27
B12 −4.740142E−28
B14 1.543834E−33

Figure 6A:
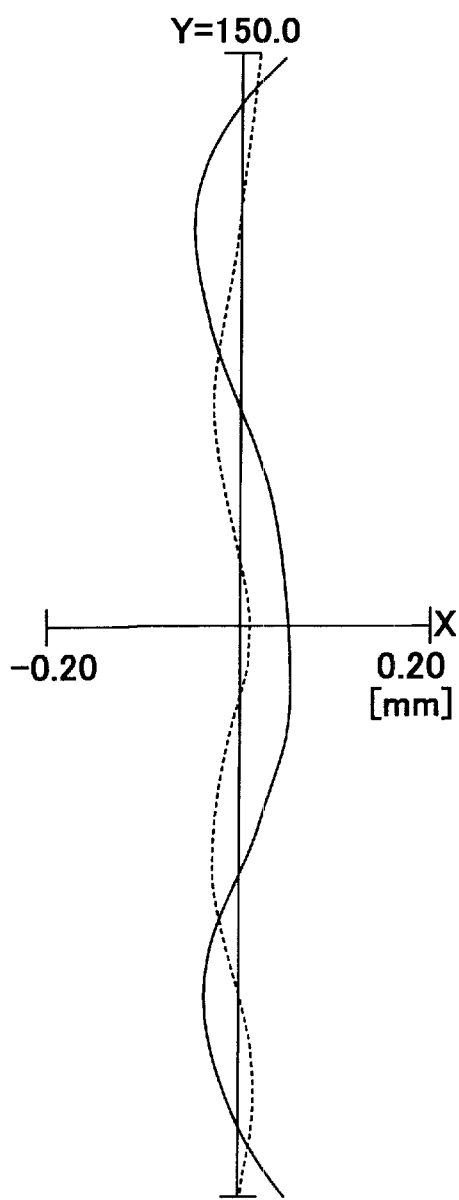
FIG. 6 is an aberration chart illustrating the results of image surface curvatures and f·θ characteristics according to the first embodiment disclosed herein.
Figure 6B:
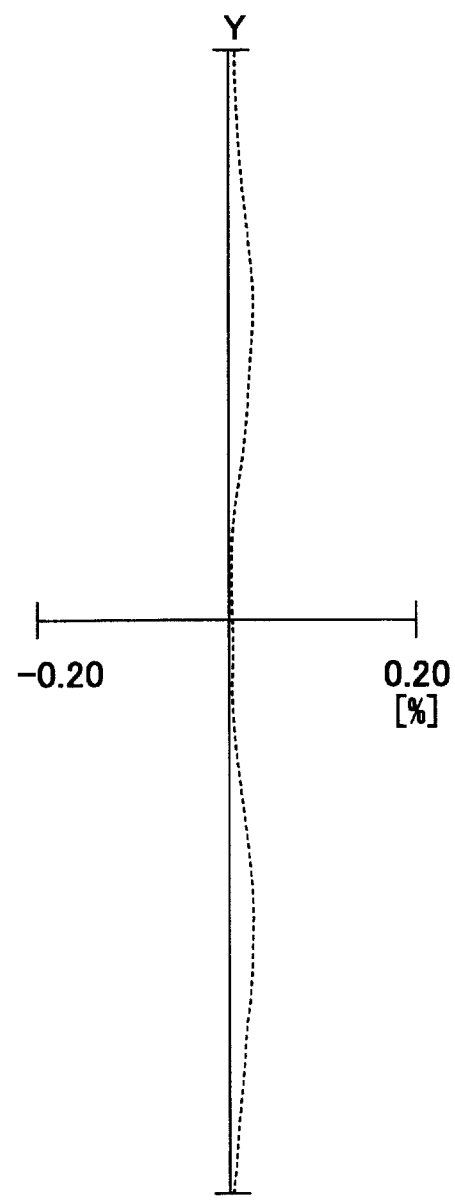

The parameters suitable for specifying the shape of 20b;
Pm=1748.583900, Rs=−27.934602
A00 −5.488740E+02
A04 −4.978348E−08
A06 2.325104E−12
A08 −7.619465E−17
A10 3.322730E−21
A12 −3.571328E−26
A14 −2.198782E−30
B01 −5.944793E−07
B02 3.797718E−07
B03 −3.384574E−11
B04 −3.480486E−11
B05 −2.174181E−15
B06 2.182283E−15
B07 1.108834E−18
B08 −6.174644E−20
B09 −1.150807E−22
B10 −4.950043E−24
B11 5.563203E−27
B12 −9.153840E−29
B13 −1.182178E−31
B14 −7.639809E−33
For the optical scanning apparatus thus formed, the results obtained of the image surface curvature and f·θ characteristic are shown in FIG. 6. In addition, the following results were obtained of $\Delta P1/\Delta P2$, $|\beta(0)|$ and $|\beta(\theta)/\beta(0)|$.
$\Delta P1/\Delta P2 = 1.395E-02$
$|\beta(0)| = 0.921$
$|\beta(\theta)/\beta(0)| = 0.897$

EXAMPLE 2

An optical scanning apparatus was fabricated in a similar manner to Example 1. Namely, an LD device was used as a light source having emissions at a wavelength of 780 nm, and a lens with a focal length of 27 mm was used as a coupling lens which serves for collimating laser beams. A polygonal mirror used herein had five reflecting faces provided so as to be inscribed by a circle having a radius of 18 mm. The beam scanning was carried out such that the angle between the direction of light beam incidence and the optical axis of beam scanning was 60°, with ±150 mm width of beam writing, and ±38° width of scanning angle.

In addition, the elements included in the scanning unit of FIG. 1 were adjusted to have distances such as d1=71.6 mm, d2=30 mm, d3=66.32 mm, d4=8.5 mm, d5=159.345 mm, d6=0.274 mm, and d7=0.274 mm.

The reflectivity for respective lenses, 10 and 20, was found as 1.523978 ($\lambda$=780 nm at 25° C.).

In similar manner to Example 1, several sets of parameters are shown herein below, which are suitably used for specifying the shape of the surface of anamorphic optical elements, L1 and L2, in which 10a and 10b designate the surfaces of the element L1 (FIG. 1) opposing to the beam deflector 4 and the photoreceptor 5, respectively, while 20a and 20b designate the surfaces of the element L2 opposing to the beam deflector 4 and the photoreceptor 5, respectively.

The parameters suitable for specifying the shape of 10a;
Rm=−1030.233346, Rs=−83.3777
A00 −4.041619E+02
A04 6.005017E−08

A06 −7.538155E−13
A08 −4.036824E−16
A10 4.592164E−20
A12 −2.396524E−24
B02 5.157543E−07
B04 −6.755189E−11
B06 −2.742019E−14
B08 −2.109276E−18
B10 6.756230E−23

The parameters suitable for specifying the shape of 10b;
Rm=−109.082474, Rs=−118.657036
A00 −5.427642E−01
A04 9.539024E−08
A06 4.882194E−13
A08 −1.198993E−16
A10 5.029989E−20
A12 −5.654269E−24
B01 −7.808458E−08
B02 −4.189053E−07
B03 7.218398E−11
B04 −9.329020E−11
B05 2.625744E−14
B06 8.282850E−15
B07 1.879697E−18
B08 8.995450E−20
B09 −7.781569E−22
B10 −1.330777E−21

The parameters suitable for specifying the shape of 20a;
Rm=1493.654587, Rs=−70.374394
A10 5.479389E+01
A04 −7.606757E−09
A06 −6.311203E−13
A08 6.133813E−17
A10 −1.482144E−21
A12 2.429275E−26
A14 −1.688771E−30
B02 −4.748030E−08
B04 2.352347E−11
B06 −1.851507E−15
B08 1.527506E−20
B10 3.085263E−27
B12 −4.785098E−28
B14 6.995809E−34

The parameters suitable for specifying the shape of 20b;
Rm=1748.583900, Rs=−27.8255
A00 −5.488740E+02
A04 −4.978348E−08
A06 2.325104E−12
A08 −7.619465E−17
A10 3.322730E−21
A12 −3.571328E−26
A14 −2.198782E−30
B01 −5.344320E−07
B02 3.849713E−07
B03 −3.785591E−11
B04 −3.487464E−11
B05 −2.389335E−15
B06 2.169365E−15
B07 1.135268E−18
B08 −6.289325E−20
B09 −1.118479E−22
B10 −5.020606E−24
B11 5.637323E−27
B12 −9.388938E−29
B13 −1.465510E−31
B14 −7.456119E−33

Figure 7A:
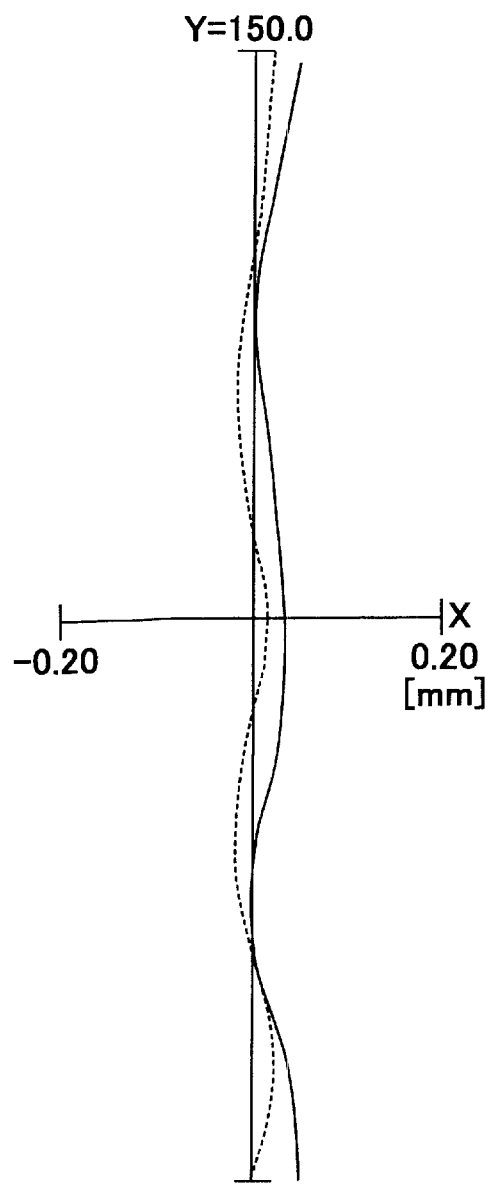
FIG. 7 is an aberration chart illustrating the results of image surface curvatures and f·θ characteristics according to the second embodiment disclosed herein.
Figure 7B:
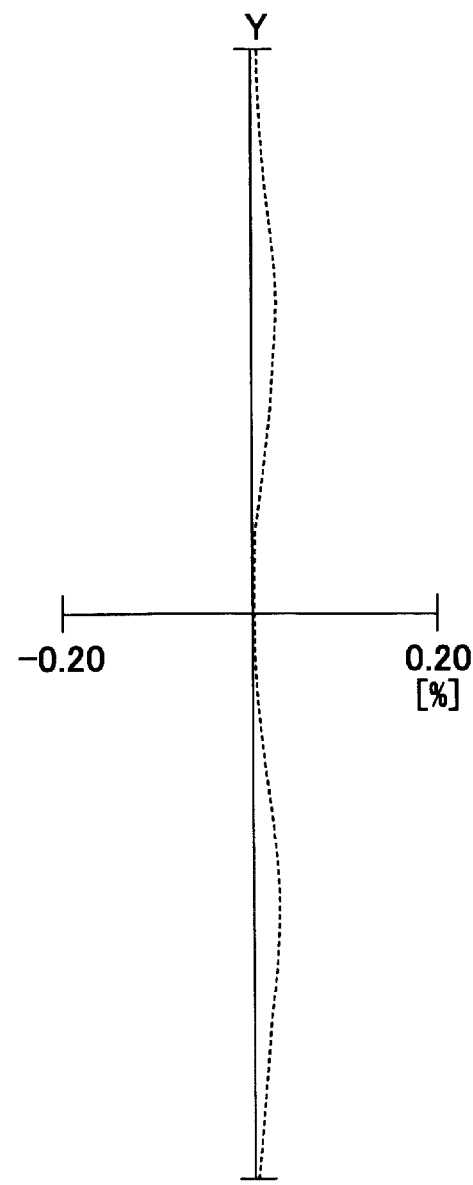

For the optical scanning apparatus thus formed, the results obtained of the image surface curvature and f·θ characteristic are shown in FIG. 7. In addition, the following results were obtained of $\Delta P1/\Delta P2$, $|\beta(0)|$ and $|\beta(\theta)/\beta(0)|$.

$\Delta P1/\Delta P2 = 2.535E-02$
$|\beta(0)| = 0.894$
$|\beta(\theta)/\beta(0)| = 0.89$

EXAMPLE 3

Another optical scanning apparatus was fabricated in a similar manner to Example 2. Namely, an LD device was used as a light source having emissions at a wavelength of 780 nm, and a lens with a focal length of 27 mm was used as a coupling lens which serves for collimating laser beams. A polygonal mirror used herein had five reflecting faces provided so as to be inscribed by a circle having a radius of 18 mm. The beam scanning was carried out such that the angle between the direction of light beam incidence and the optical axis of beam scanning was 60°, with ±150 mm width of beam writing, and ±38° width of scanning angle.

In addition, the elements included in the scanning unit of FIG. 1 were adjusted to have distances such as d1=71.6 mm, d2=30 mm, d3=66.32 mm, d4=8.5 mm, d5=159.345 mm, d6=0.274 mm, and d7=0.274 mm.

The reflectivity for respective lenses, 10 and 20, was found as 1.523978 ($\lambda$=780 nm at 25° C.).

In similar manner to Example 2, several sets of parameters are shown herein below, which are suitably used for specifying the shape of the surface of anamorphic optical elements, L1 and L2, in which 10a and 10b designate the surfaces of the element L1 (FIG. 1) opposing to the beam deflector 4 and the photoreceptor 5, respectively, while 20a and 20b designate the surfaces of the element L2 opposing to the beam deflector 4 and the photoreceptor 5, respectively.

The parameters suitable for specifying the shape of 10a;
Rm=−1030.233346, Rs=−79.097375
A00 −4.041619E+02
A04 6.005017E−08
A06 −7.538155E−13
A08 −4.036824E−16
A10 4.592164E−20
A12 −2.396524E−24
B02 8.363888E−07
B04 1.565569E−10
B06 2.478261E−14
B08 4.912169E−18
B10 9.106908E−22

The parameters suitable for specifying the shape of 10b;
Rm=−109.082474, Rs=−63.348142
A00 −5.427642E−01
A04 9.539024E−08
A06 4.882194E−13

A08 -1.198993E-16
A10 5.029989E-20
A12 -5.654269E-24
B01 3.714749E-07
B02 -7.114309E-07
B03 7.235196E-11
B04 3.216674E-11
B05 1.419916E-13
B06 2.610073E-14
B07 -2.625060E-17
B08 5.805904E-18
B09 -1.502202E-21
B10 8.931588E-22

The parameters suitable for specifying the shape of 20a;
Rm=1493.654587, Rs=-62.690366
A00 5.479389E+01
A04 -7.606757E-09
A06 -6.311203E-13
A08 6.133813E-17
A10 -1.482144E-21
A12 2.429275E-26
A14 -1.688771E-30
B02 -5.203245E-08
B04 1.830862E-11
B06 -1.951662E-15
B08 -1.214349E-20
B10 -3.579368E-24
B12 -8.245156E-28
B14 -2.290574E-32

The parameters suitable for specifying the shape of 20b;
Rm=1748.583900, Rs=-28.67101
A00 -5.488740E+02
A04 -4.978348E-08
A06 2.325104E-12
A08 -7.619465E-17
A10 3.322730E-21
A12 -3.571328E-26
A14 -2.198782E-30
B01 -9.267064E-07
B02 2.796982E-07
B03 -3.639291E-11
B04 -3.558108E-11
B05 -3.218427E-15
B06 1.830124E-15
B07 1.103838E-18
B08 -1.037411E-19
B09 -1.128466E-22
B10 -7.476996E-24
B11 6.277306E-27
B12 -2.706136E-28
B13 2.115775E-32
B14 -2.857513E-32

Figure 8A:
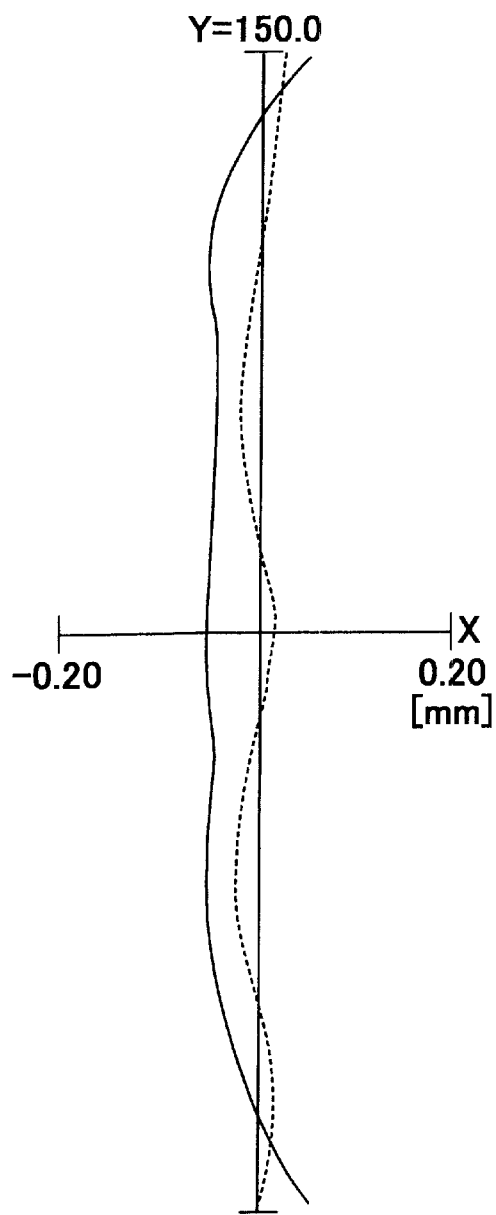
FIG. 8 is an aberration chart illustrating the results of image surface curvatures and f·θ characteristics according to the third embodiment disclosed herein.
Figure 8B:
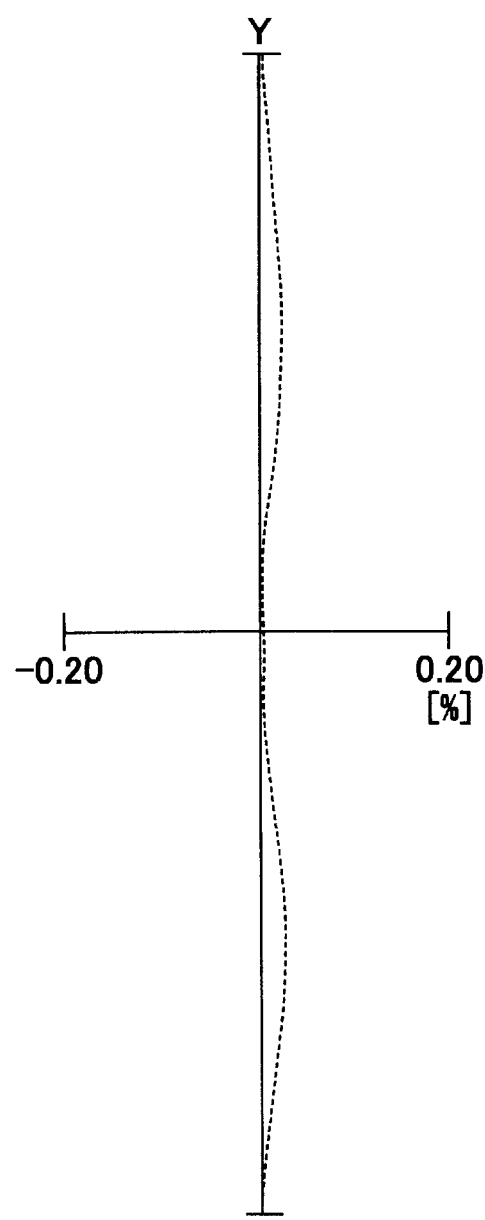
Figure 9A:
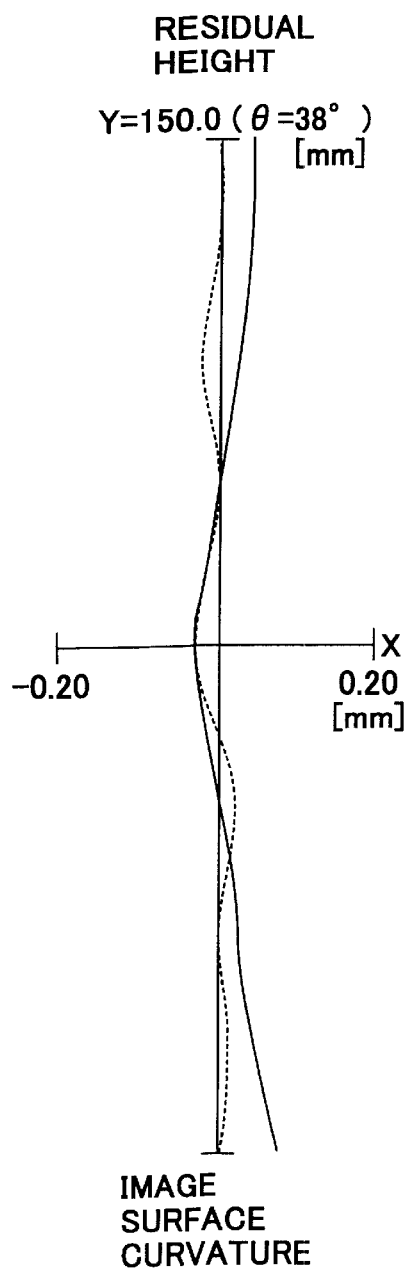
FIG. 9 is an aberration chart illustrating the results of image surface curvatures and f·θ characteristics according to the fourth embodiment disclosed herein.
Figure 9B:
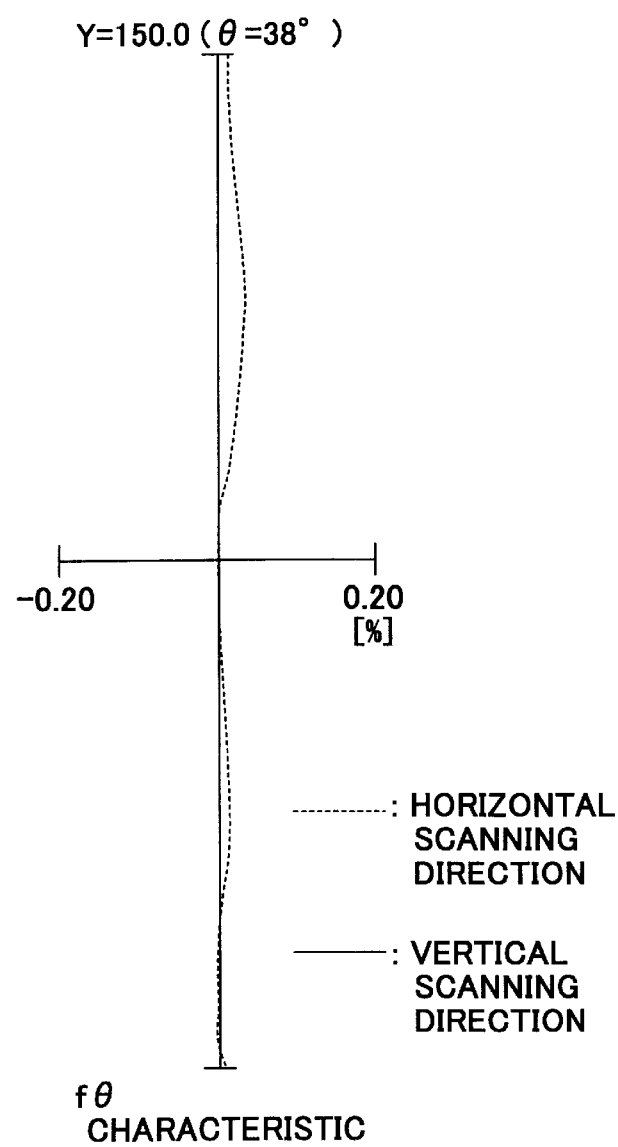
Figure 10:
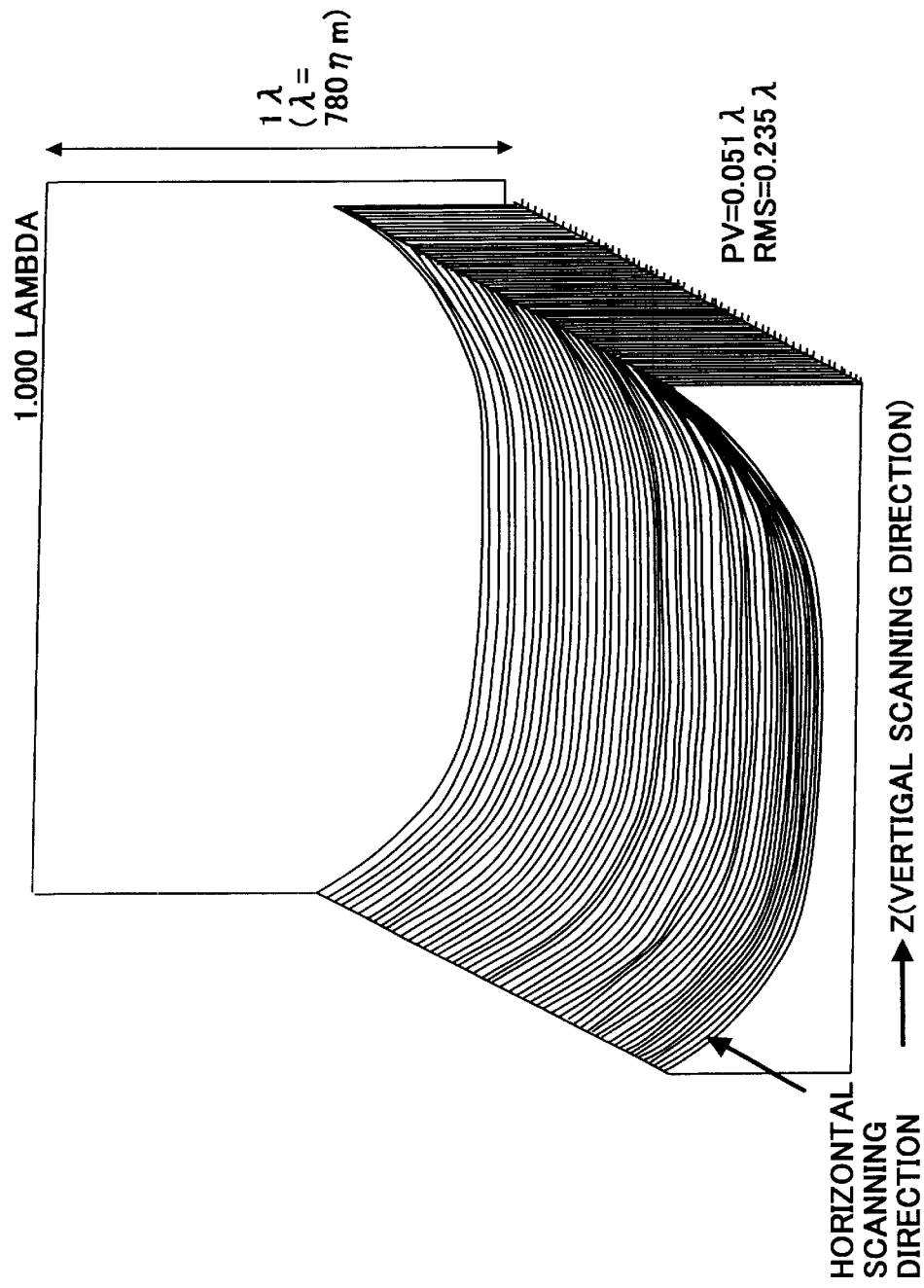
FIG. 10 is a wavefront aberration chart for the second surface of the second anamorphic optical element L2 on the optical axis (i.e., at the deflection angle 0), in which the second surface is formed as a circular arc which is defined by removing the terms, $Z^4$ and $Z^6$, from the relation for defining the sub-noncircular arc.

For the optical scanning apparatus thus formed, the results obtained of the image surface curvature and f·θ characteristic are shown in FIG. 8 In addition, the following results were obtained of $\Delta P1/\Delta P2$, $|\beta(0)|$ and $|\beta(\theta)/\beta(0)|$.

$\Delta P1/\Delta P2$=7.191E-02

$|\beta(0)|$=1.043
$|\beta(\theta)/\beta(0)|$=0.934

EXAMPLE 4

Another optical scanning apparatus was fabricated in a similar manner to Example 3. Namely, an LD device was used as a light source having emissions at a wavelength of 780 nm, and a lens with a focal length of 27 mm was used as a coupling lens which serves for collimating laser beams. A polygonal mirror used herein had five reflecting faces provided so as to be inscribed by a circle having a radius of 18 mm. The beam scanning was carried out such that the angle between the direction of light beam incidence and the optical axis of beam scanning was 60°, with ±150 mm width of beam writing, and ±38° width of scanning angle.

In addition, the elements included in the scanning unit were adjusted to have distances such as d1=67.95 mm, d2=29 mm, d3=69.99 mm, d4=8.4 mm, d5=159.345 mm, d6=0.617 mm, and d7=0.692 mm.

The reflectivity for respective lenses, 10 and 20, was found as 1.523978 ($\lambda$=780 nm at 25° C.).

In similar manner to Example 3, several sets of parameters are shown herein below, which are suitably used for specifying the shape of the surface of anamorphic optical elements, L1 and L2, in which 10a and 10b designate the surfaces of the element L1 (FIG. 1) opposing to the beam deflector 4 and the photoreceptor 5, respectively, while 20a and 20b designate the surfaces of the element L2 opposing to the beam deflector 4 and the photoreceptor 5, respectively.

The parameters suitable for specifying the shape of 10a;
Rm=-879.523031, Rs=-86.708318
A00 -2.999565E+02
A04 5.840226E-08
A06 -7.031731E-13
A08 -4.076569E-16
A10 4.233901E-20
A12 -4.814312E-25
B01 -2.501931E-05
B02 1.653737E-07
B03 -7.668693E-09
B04 -3.347034E-10
B05 -2.949933E-12
B06 3.136104E-14
B07 -4.389653E-16
B08 -1.427572E-17
B09 -1.465159E-19
B10 -7.094010E-21
B11 8.733177E-24
B12 1.130805E-24

The parameters suitable for specifying the shape of 10b;
Rm=-109.919165, Rs=-111.992196
A00 -5.405613E-01
A04 9.549366E-08
A06 5.978332E-13
A08 -1.512165E-16
A10 5.14164-E-20
A12 -3.738053E-24
B01 -1.605404E-05
B02 -7.162447E-07
B03 -5.180572E-09

B04 −1.778869E−10
B05 −1.281277E−12
B06 2.814741E−14
B07 −2.750303E−16
B08 −1.201453E−17
B09 −7.436758E−20
B10 −1.740300E−21
B11 −1.798361E−23
B12 −1.081383E−25
The parameters suitable for specifying the shape of 20a;
Rm=2883.084679, Rs=−70.343210
A00 0.000000E+00
A04 −1.017323E−08
A06 −8.249685E−13
A08 5.922099E−17
A10 −1.488225E−21
A12 1.726797E−26
A14 −2.547787E−30
B02 1.586755E−08
B04 2.850690E−11
B06 −1.520013E−15
B08 9.541961E−20
B10 6.832355E−24
B12 1.140863E−29
The parameters suitable for specifying the shape of 20b;
Rm=13794.470317, Rs=−27.973086
A00 0.000000E+00
A04 −6.171793E−08
A06 2.273852E−12
A08 −8.120726E−17
A10 2.944331E−21
A12 −4.952200E−26
A14 −2.224465E−30
B01 1.039242E−06
B02 4.265436E−07
B03 −6.419878E−11
B04 −3.400559E−11
B05 7.084184E−15
B06 2.615682E−15
B07 1.471965E−18
B08 −7.145501E−21
B09 −6.625463E−23
B10 1.494741E−24
B11 1.040072E−28
B12 4.325510E−28
I00 9.435458E−06
I01 −8.721213E−08
I02 −6.165176E−09
I03 9.895040E−11
I04 1.178927E−12
I05 −3.186398E−14
I06 −1.196914E−16
I07 3.615834E−18
I08 −1.321509E−21
I09 −8.339640E−23
I10 2.415787E−24
I11 −4.959413E−27
I12 −1.910252E−28
K00 −1.977390E−07
K01 1.224927E−09
K02 3.838264E−10
K03 −2.288362E−12
K04 −1.681843E−14
K05 7.708433E−16
K06 −5.309053E−18
K07 −3.425891E−20
K08 −1.170404E−22
K09 −1.130785E−23
K10 7.484206E−26
K11 9.291051E−28
K12 −1.681956E−30

For the optical scanning apparatus thus formed, the results obtained of the image surface curvature and f·θ characteristic are shown in FIG. 8 In addition, the following results were obtained of $\Delta P1/\Delta P2$, $|\beta(0)|$ and $|\beta(\theta)/\beta(0)|$.

$\Delta P1/\Delta P2 = 1.342E-02$ $|\beta(0)| = 0.922$ $|\beta(\theta)/\beta(0)| = 0.94$ The apparatus and process steps including the computation set forth in the present description may therefore be implemented using the host computer and terminals disclosed herein incorporating appropriate processors programmed according to the teachings disclosed herein, as will be appreciated to those skilled in the relevant arts.

Therefore, the present disclosure also includes a computer-based product which may be hosted on a storage medium and include instructions which can be used to program a processor to perform a process in accordance with the present disclosure. The storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

It is apparent from the above description that the light beam scanning apparatus disclosed herein has advantages over previous similar apparatuses.

For example, as described earlier, undesirable changes in the diameter of beam spot in beam spot diameter in the vertical scanning direction, which is caused by a large image height, can be alleviated properly; yet reducing undue increase in aberration caused by possible errors at fabrication or assembly steps. This becomes feasible by providing the third optical unit consisting of the first and second anamorphic optical elements, each having a positive power along the horizontal direction and the vertical scanning direction, respectively, with the magnification of the third optical unit to be approximately constant and the power of the first anamorphic optical element approximately constant irrespective of deflection angle for the light beams.

In addition, by bringing the curvatures of cross section of the first and second anamorphic optical elements are made to vary independently of the shape of the optical elements in the horizontal and vertical scanning directions, respectively, design flexibility for the element can be increased, its aberration is properly corrected, and undesirable changes in beam spot diameter in the vertical scanning direction, which is caused by a large image height, can also be alleviated.

These improvements in the design flexibility, aberration, and beam spot diameter become feasible also by providing the second anamorphic optical element having a positive power primarily along the vertical scanning direction, which is formed having a specified surface shape with the curvature of the cross section thereof depending on the position in the vertical scanning direction such that the magnification of the third optical unit is approximately constant irrespective of deflection angle θ.

Furthermore, the slanting of image surface curvature in the vertical scanning direction can be effectively corrected, which is caused by the sag. This becomes feasible by forming at least one of the first and second anamorphic optical elements with a specified surface shape such that the curvature of its cross section in the vertical scanning direction varies independently of its shape in the horizontal scanning direction and that the shape varies asymmetrically depending on the scanning position in the horizontal scanning direction.

In addition, by forming at least one of the surface shapes of the first and second anamorphic optical elements in the form of non-circular arc, the wavefront aberration in the vertical scanning direction can be effectively corrected, and a previous difficulty in focusing the beam spot as small as in the order of 30 μm in diameter, can be obviated.

The third optical unit can be formed with two optical elements in place of three or more elements. This facilitates to reduce product costs and cumulative errors during fabrication and assembly steps. In addition, if two lenses are used in this case, the deterioration in the wavefront aberration, or coma-aberration, can be reduced, which is generally caused by the decentering which is otherwise carried out for properly separating the beam flux as in the case using a reflection type imaging unit.

By bringing the lateral magnification, β(0), in a vertical scanning direction on the optical axis of the third optical unit as specified, undesirable increase in the size of optical elements is alleviated and undue increase in aberration caused by possible errors at fabrication or assembly steps can be reduced.

Furthermore, by bringing the value, β(θ)/β(0), as specified, undue changes can be obviated in the distance between neighboring scanning lines, and the distance can remain approximately constant irrespective of the deflection angle. This is particularly effective in the case of the multiple-beam light source such as an LDA and synthesized multiple-beam source. The multiple-beam light source is quite useful for decreasing the number of rotation of light beam deflector, to thereby facilitate to decrease power consumption as well as prolong life of the light deflector.

It is added further the image forming system suitably incorporating various optical units and elements recited in the present disclosure has various excellent capabilities such as forming stable electrostatic latent images, among others.

Additional modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application No. 2001-235438, filed with the Japanese Patent Office on Aug. 2, 2001, the entire contents of which are hereby incorporated by reference.

What is claimed as new and desired to be secured by letters patent of the United States is:

1. A light beam scanning apparatus, comprising:
   light source configured to emit light beams;
   first optical unit configured to optically couple together said light beams emitted from said light source;
   second optical unit configured to converge said light beams received from said first optical unit into an approximately line image elongated along a horizontal scanning direction;
   light beam deflector configured to deflect said light beams received from the second optical unit by interaction with reflecting planes situated at least at a vicinity of a position of formation of said approximately line image; and
   third optical unit configured to converge said light beams deflected by said light beam deflector into a spot of light formed on a surface to be scanned;
   wherein said third optical unit includes a first anamorphic optical element and a second anamorphic optical element with each anamorphic optical element having a positive power along the horizontal scanning direction and a vertical scanning direction, respectively;
   and wherein a magnification of said third optical unit is made approximately constant irrespective of deflection angle and a power of said first anamorphic optical element is also made approximately constant irrespective of deflection angle.

2. The light beam scanning apparatus according to claim 1, wherein:

$$0 \leq \Delta P1/\Delta P2 < 0.1,$$

where P1 and P2 are powers in the vertical scanning direction for said first anamorphic optical element and said second anamorphic optical element, respectively, and ΔP1 is a difference between a maximum value and a minimum value of P1, while ΔP2 is a difference between a maximum value and a minimum value of P2.

3. The light beam scanning apparatus according to claim 1, wherein:
   a curvature of a cross section of said first anamorphic optical element varies independently of a shape thereof in the horizontal scanning direction.

4. The light beam scanning apparatus according to claim 1, wherein:
   a curvature of a cross section of said second anamorphic optical element varies independently of a shape thereof in the horizontal scanning direction.

5. The light beam scanning apparatus according to claim 1, wherein:
   said second anamorphic optical element is formed having a specified surface shape with a curvature of a cross section thereof depending on a position in the vertical scanning direction such that the magnification of said third optical unit is made approximately constant irrespective of deflection angle.

6. The light beam scanning apparatus according to claim 5, wherein:
   said light source is a multiple-beam light source emitting multiple fluxes of light beams.

7. The light beam scanning apparatus according to claim 1, wherein:
   at least one of said first and second anamorphic optical elements is formed with a specified surface shape such that the curvature of a cross section thereof in the vertical scanning direction varies independently of a shape thereof in the horizontal scanning direction and that a shape thereof varies asymmetrically depending on a position in the horizontal scanning direction.

8. The light beam scanning apparatus according to claim 7, wherein:
said light source is a multiple-beam light source emitting multiple fluxes of light beams.

9. The light beam scanning apparatus according to claim 1, wherein:
at least one of surfaces of said first and second anamorphic optical elements is in a form of a non-circular arc.

10. The light beam scanning apparatus according to claim 1, wherein:
said third optical unit consists of two anamorphic optical elements.

11. The light beam scanning apparatus according to claim 1, wherein:
said third optical unit consists of two anamorphic lenses.

12. The light beam scanning apparatus according to claim 1, wherein:
a lateral magnification, $\beta(0)$, in the vertical scanning direction on an optical axis of said third optical unit satisfies a relation, $0.5<|\beta(0)|<1.5$.

13. The light beam scanning apparatus according to claim 1, wherein:
lateral magnifications, $\beta(0)$ and $\beta(\theta)$, in the vertical scanning direction of said third optical unit on an optical axis thereof and at a deflection angle, $\theta$, from said optical axis, respectively, satisfy a relation, $0.8<|\beta(\theta)/\beta(0)|<1.2$.

14. An image forming system incorporating a least one of said light beam scanning apparatus recited in anyone of claims 1 through 8.

15. A light beam scanning apparatus, comprising:
light source means for emitting light beams;
first optical means for optically coupling together said light beams emitted from said light source means;
second optical means for converging said light beams received from said first optical means into an approximately line image elongated along a horizontal scanning direction;
light beam deflector means for deflecting said light beams by interaction with reflecting planes situated at least at a vicinity of a position of formation of said approximately line image; and
third optical means for converging said light beams deflected by said light beam deflector means into a spot of light formed on a surface to be scanned;
wherein
said third optical means includes first anamorphic optical means and second anamorphic optical means, each of the anamorphic optical means having a positive power along the horizontal scanning direction and a vertical scanning direction, respectively; and wherein
a magnification of said third optical means is made approximately constant irrespective of deflection angle and a power of said first anamorphic optical means is also made approximately constant irrespective of deflection angle.

16. The light beam scanning apparatus according to claim 15, wherein:

$0 \leq \Delta P1/\Delta P2 < 0.1$, where P1 and P2 are powers in a vertical scanning direction for said first anamorphic optical means and said second anamorphic optical means, respectively, and $\Delta P1$ is a difference between a maximum value and a minimum value of P1, while $\Delta P2$ is a difference between a maximum value and a minimum value of P2.

17. The light beam scanning apparatus according to claim 15, wherein:
a curvature of a cross section of said first anamorphic optical means varies independently of a shape thereof in the horizontal scanning direction.

18. The light beam scanning apparatus according to claim 15, wherein:
a curvature of a cross section of said second anamorphic optical means varies independently of a shape thereof in the horizontal scanning direction.

19. The light beam scanning apparatus according to claim 15, wherein:
said second anamorphic optical means is formed having a specified surface shape with a curvature of a cross section thereof depending on a position in the vertical scanning direction such that the magnification of said third optical means is made approximately constant irrespective of deflection angle.

20. The light beam scanning apparatus according to claim 19, wherein:
said light source means is a multiple-beam light source emitting multiple fluxes of light beams.

21. The light beam scanning apparatus according to claim 15, wherein:
at least one of said first and second anamorphic optical means is formed with a specified surface shape such that the curvature of a cross section thereof in the vertical scanning direction varies independently of a shape thereof in the horizontal scanning direction and that a shape thereof varies asymmetrically depending on a position in the horizontal scanning direction.

22. The light beam scanning apparatus according to claim 21, wherein:
said light source means is a multiple-beam light source emitting multiple fluxes of light beams.

23. The light beam scanning apparatus according to claim 15, wherein:
at least anyone of surfaces of said first and second anamorphic optical means is in a form of a non-circular arc.

24. The light beam scanning apparatus according to claim 15, wherein:
said third optical means consists of two anamorphic optical elements.

25. The light beam scanning apparatus according to claim 15, wherein:
said third optical means consists of two anamorphic lens means.

26. The light beam scanning apparatus according to claim 15, wherein:
a lateral magnification, $\beta(0)$, in the vertical scanning direction on an optical axis of said third optical means satisfy a relation, $0.5<|\beta(\theta)|<1.5$.

27. The light beam scanning apparatus according to claim 15, wherein:
lateral magnifications, $\beta(0)$ and $\beta(\theta)$, in the vertical scanning direction of said third optical means on an optical axis thereof and at a deflection angle, $\theta$, from said optical axis, respectively, satisfy a relation, $0.8<|\beta(\theta)/\beta(0)|<1.2$.

28. An image forming system incorporating at least one of said light beam scanning apparatus recited in anyone of claims 15 through 22.

* * * * *